United States Patent [19]

Maciejewski

[11] Patent Number: 4,523,148

[45] Date of Patent: Jun. 11, 1985

[54] METHOD AND APPARATUS FOR DETERMINING THE SPONTANEOUS EARTH POTENTIAL LOG FROM DOWNHOLE GRADIENT MEASUREMENTS

[75] Inventor: Walter J. Maciejewski, Plano, Tex.

[73] Assignee: Gearhart Industries, Inc., Fort Worth, Tex.

[21] Appl. No.: 282,394

[22] Filed: Jul. 13, 1981

Related U.S. Application Data

[63] Continuation-in-part of Ser. No. 198,587, Oct. 20, 1980, abandoned.

[51] Int. Cl.$^3$ .................... G01V 3/18; G01V 3/38
[52] U.S. Cl. .................... 324/351; 324/323; 364/422
[58] Field of Search ........... 324/323, 351, 352, 366; 364/422; 73/151, 152

[56] References Cited

U.S. PATENT DOCUMENTS

| | | | |
|---|---|---|---|
| 2,230,999 | 2/1941 | Doll | 324/351 |
| 2,728,047 | 12/1955 | Doll | 324/352 |
| 2,742,605 | 4/1956 | McMillan | 324/366 |
| 2,992,389 | 7/1961 | Gondouin | |
| 3,047,795 | 7/1962 | Pearson | 324/366 X |
| 3,065,406 | 11/1962 | Mayes | 324/366 |
| 3,268,801 | 8/1966 | Clements et al. | 324/351 |
| 3,309,521 | 3/1967 | Bargainer | 324/323 |
| 3,457,497 | 7/1969 | Schuster | 324/323 |
| 3,457,498 | 7/1969 | Schuster | 324/323 |
| 3,457,500 | 7/1969 | Schuster | 324/323 |
| 3,494,186 | 2/1970 | Johns et al. | |
| 3,638,105 | 1/1972 | Schuster | 324/351 |
| 3,638,106 | 1/1972 | Cram | 324/351 |
| 3,691,456 | 9/1972 | Warren | 324/351 |
| 3,715,653 | 2/1973 | Sauter | 324/351 |

OTHER PUBLICATIONS

Koerperich, "A Double-Electrode Method of Spontaneous Potential Logging", Journal of Petroleum Technology, V. 22, Nov. 1970, pp. 1437-1446.

*Primary Examiner*—Gerard R. Strecker
*Attorney, Agent, or Firm*—Head, Johnson & Stevenson

[57] ABSTRACT

A method and apparatus for measuring the differential or gradient of an earth variable within a well bore (e.g., the spontaneous earth potential) and producing improved logs of this gradient or differential and its integral variable essentially free of any accumulated instrument and base line drift or error. The differential spontaneous potential of an earth formation traversed by a well bore is measured at repeated multiple depths by moving a pair of closely spaced electrodes through the well bore wherein each electrode is electrically insulated externally from the other and from a third downhole local ground (such as the well tool cable) to which each is internally resistively referenced. The measured electrical potential across the closely spaced electrodes is amplified and digitized before being transmitted to the earth's surface, whereupon an averaged value of such differential measurements within a traveling data window of predetermined length and adjacent to each successive measurement is used to adjust for base line drift, noise and instrument induced error. The resulting compensated differential logs are integrated, resulting in spontaneous potential logs of improved character.

14 Claims, 15 Drawing Figures

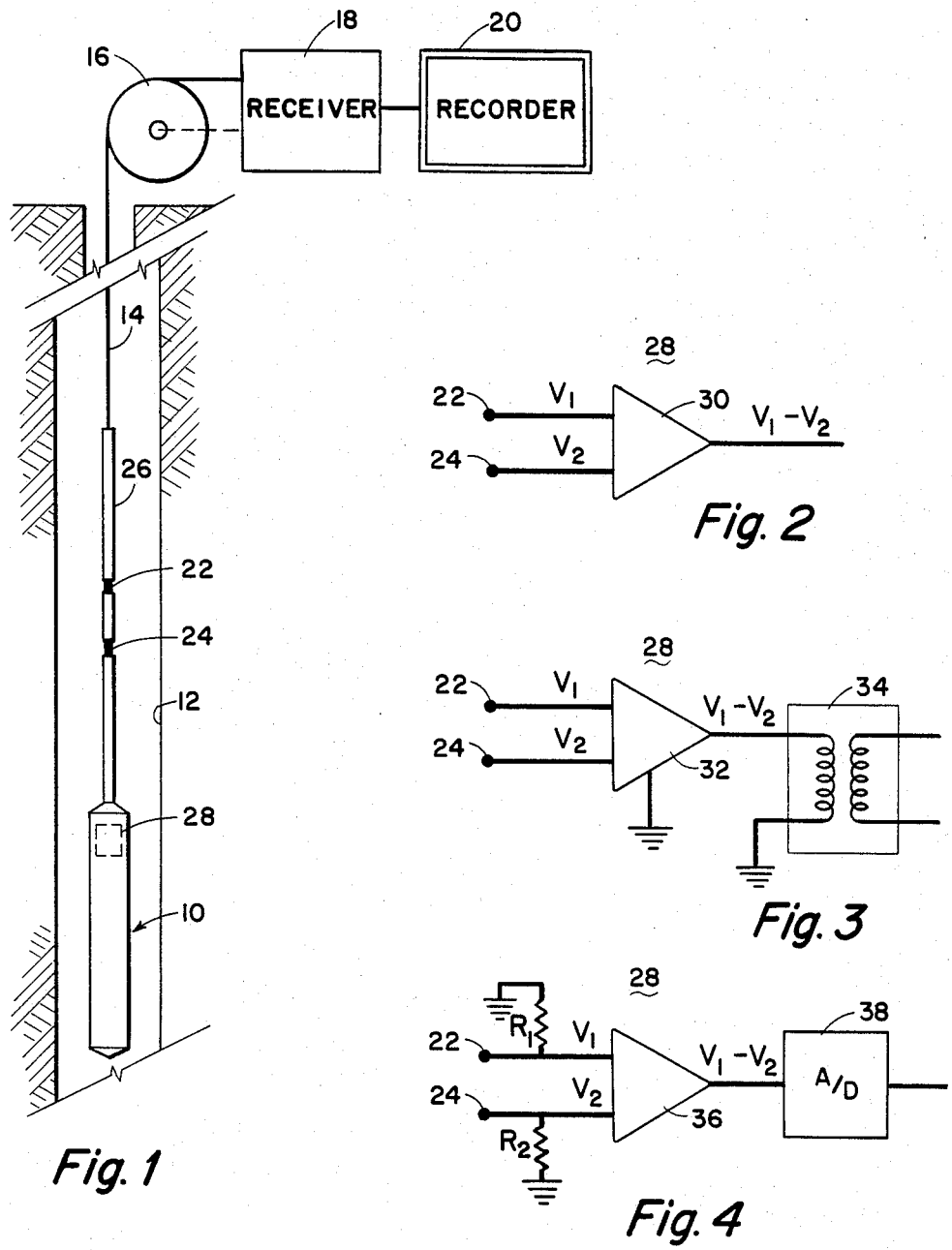

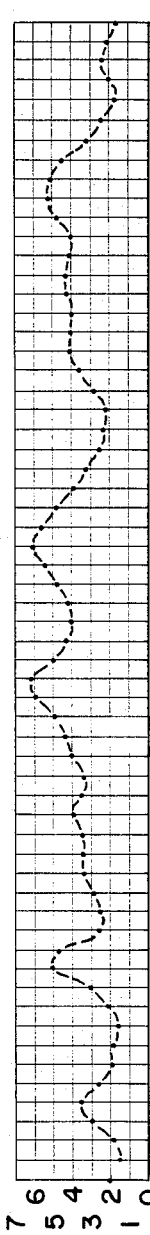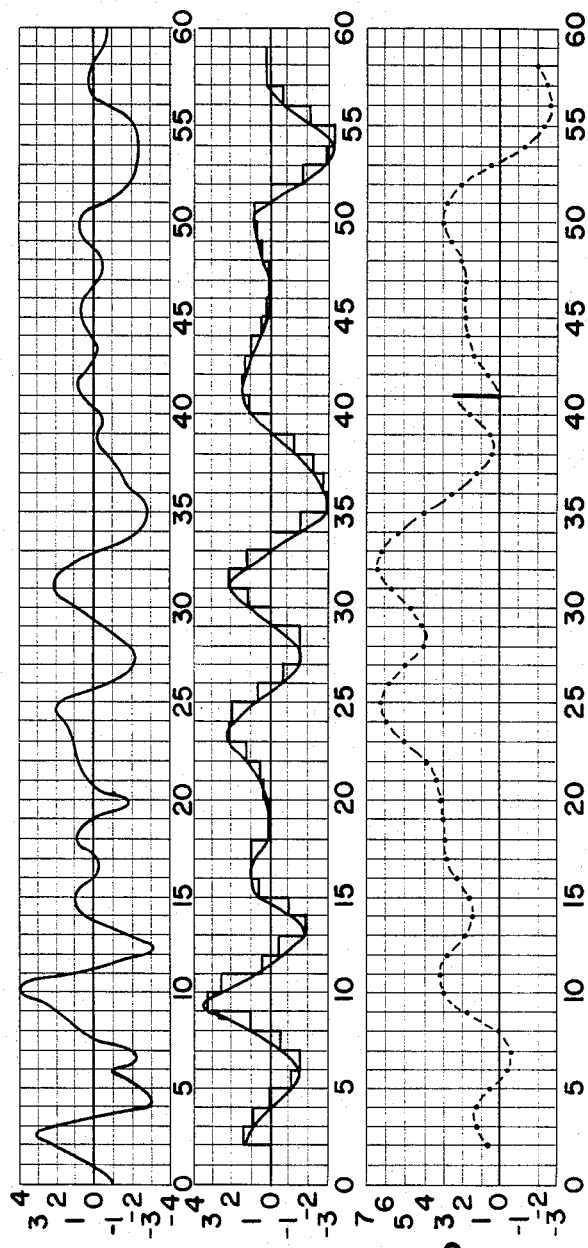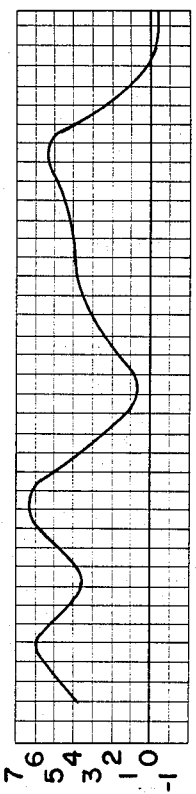
Fig. 8  Fig. 9  Fig. 11  Fig. 12  Fig. 10  Fig. 13

METHOD AND APPARATUS FOR DETERMINING THE SPONTANEOUS EARTH POTENTIAL LOG FROM DOWNHOLE GRADIENT MEASUREMENTS

CROSS-REFERENCE TO RELATED APPLICATION

This is a continuation-in-part of application Ser. No. 198,587, filed the 20th day of Oct., 1980, now abandoned.

BACKGROUND OF THE INVENTION

1. Field of the Invention

This invention relates to a method and apparatus for determining well logs from downhole differential or gradient measurements. More specifically, the invention relates to a method and apparatus for determining the spontaneous potential voltage existing in earth formations traversed by a well bore.

2. Description of the Prior Art

The spontaneous electrical potential, or self-potential (SP), is the naturally produced galvanic potential phenomenon produced at the interface of the drilling mud in the well bore and the well formations in conjunction with the interface between dissimilar but adjacent earth formations. Measurement of the self-potential as a diagnostic approach in determining characteristics of earth formations has been in extensive public use since about 1935. Knowledge and understanding of the self-potential has slowly evolved from an original mere recognition of its existence to its present day quantitative use.

There are many factors which have complicated self-potential interpretation and restrained its use as an absolutely reliable guide to formation bed characteristics and boundaries. Such factors may be the well bore diameter, drilling mud filtrate invasion, properties of the formation fluids, and characteristics of the subsurface data. Salts, carbonates, and fresh water greatly modify and reduce the quantitative use of the self-potential measurement. Shaley sand formations create conditions hampering self-potential interpretation. An even greater problem is electrical "noise" which is the predominate source of low quality and erroneous self-potential measurements and resulting low quality SP log curves.

A principle source of such electrical noise is related to variations in the ground potential at the earth's surface to which the well bore spontaneous potentials are usually referenced. The causes of such noise include disruptive electrical currents adjacent to the earth's surface near the well bore, magnetization of the well logging equipment at the earth's surface, inadequate ground connection with reference to the potential measurement electrode, and related factors.

Often the exact influence of some or all of these factors affecting spontaneous potential response cannot be known, predicted, or eliminated. Consequently other tools, where available, are used in conjunction with SP logging equipment to determine the desired formation information. Focused induction resistivity determining devices are commonly used for this purpose.

Despite the limitations of the self-potential log, there are a number of occasions and areas where it satisfactorily reflects permeable bed boundaries and, when auxiliary logs are not available to refine the self-potential measurement, the self-potential is used as the primary indicator of bed boundaries. In these cases, the method of recording, operating on, and displaying SP data as provided by the present invention can provide both supplemental and enhanced variations on the conventional SP curve.

Various methods for measuring spontaneous potential have previously been disclosed. In U.S. Pat. No. 2,992,389 one or more toroidal coils of saturable magnetic cores are employed to detect induced current flow. In U.S. Pat. No. 3,268,801 two relatively close electrodes are used to drive galvanometers with attached mirrors and optical recording device to measure the electrical potential drop across the electrodes during drilling. In U.S. Pat. Nos. 3,638,105, and 3,638,106 a three electrode system producing an SP log is disclosed wherein one downhole exploring electrode is referenced to a downhole local ground electrode with low frequency filtering to produce a high frequency contribution to SP and is also referenced to a surface electrode with high frequency filtering to produce a low frequency contribution to SP. Similarly, U.S. Pat. Nos. 3,691,456 and 3,715,653 describe methods for converting such three electrode SP measurements from a function of spacial coordinates to a function of time.

A rather comprehensive paper by E. A. Koerperich, entitled "A DOUBLE-ELECTRODE METHOD FOR SPONTANEOUS POTENTIAL LOGGING", has been published in the November 1979 issue of *Journal of Petroleum Technology*. The method presented in Mr. Koerperich's paper is acknowledged as being directly derived from a single conventional SP curve measurement or from two conventional SP curves simultaneously recorded at different depths in the well bore with the exploring electrode or electrodes being referenced to a surface ground electrode. A so-called "Delta SP curve" is then constructed as the difference between the two conventional SP curves. In addition to the Delta SP curve being useful in conjunction with the conventional SP curve, certain advantages over the conventional SP curve are suggested including the improved determination of bed boundary locations and bed thicknesses, particularly when surface generated noise signals exist on the SP curve. However, the article concludes, "The system would not be expected to eliminate noise that could be introduced on one electrode signal independent of the other signal—as in the case of noise introduced on the collector where individual signals are picked off the conductors and transferred to the panel."

Further insight into the noise problem associated with a direct gradient or differential SP measurement appears in the previously mentioned U.S. Pat. No. 3,638,105 where it is stated, "To produce a noiseless SP log, it has been previously suggested to measure the differential SP or SP gradient; i.e., the difference in potential between two relatively closely spaced downhole electrodes, and integrate this difference in potential to arrive at the trace SP value. However, any DC-type noise caused by polarization, or amplifier zero error, will be converted into a very large error in a relatively short time by the integrator in such a system."

SUMMARY OF THE INVENTION

In view of the above stated problems associated with prior art methods for measuring the differential spontaneous electrical potential (the spontaneous potential gradient herein simply referred to by the term "Delta SP"), I have discovered a method and apparatus for measuring, in a continuous fashion, the difference of an earth variable between two closely spaced positions within a well bore as the apparatus is moved to successive depths through the well bore. The method and apparatus herein disclosed provides a way to compensate for noise, drift and accumulation of numerical error by establishing a window of differential measurements adjacent to the position of each measurement and establishing a weighted averaged value of said measurements within the window. Each successive measurement is then compensated for base line drift and noise by subtracting the weighted averaged value within the adjacent window, thus producing a well log that reflects only the desired component of the gradient measurement. Upon integration of this compensated differential log an integral well log is produced which is essentially free of undesired baseline shifts.

The instant invention also provides a method and apparatus for measuring, determining and logging the Delta SP appearing at or between two closely spaced electrodes located at different depths in the well bore as the electrodes are simultaneously moved through the well bore. The concern over variations in absolute surface potential and the corresponding noise and drift problems associated with the prior art use of a surface reference electrode are not important herein, because according to the instant invention each electrode is either referenced to or in resistive communication with a remote third downhole reference ground electrode. Optionally the Delta SP and the integrally derived SP log can be further processed for base line drift and accumulated numerical error by establishing adjacent windows and average values within said windows for producing compensated well logs. In this manner the resulting differential and integral spontaneous potential curves more accurately reflect downhole spontaneous potentials. It is further provided that the differential or gradient measurements be amplified and/or digitized downhole before being transmitted to the earth's surface, thus preserving numerical accuracy over a broad range.

One object of the present invention is to eliminate substantially all extraneous noise as may be found in the usual SP and Delta SP curves, caused by telluric currents, influencing AC voltages, magnetic fields, DC polarization noise, amplifier zero level shift, and the like.

Another object of the invention is to produce a reliable SP curve and a reliable Delta SP curve simultaneously along with curves for other logs.

A further object of this invention is to produce reliable SP curves through a well logging cable and a cable hoisting drum assembly where magnetization of the assembly is not a serious problem.

Yet another object of this invention is to provide well logging apparatus where the usual mud pit ground electrode or "fish" is no longer essential and no longer needed for the SP curve.

These and other objects are attained by a method and apparatus, including means for moving at least two spaced apart electrodes to successive depths within a well bore which are included in a well tool located within the well bore, for continuously measuring an electrical potential difference existing between two electrodes with reference to a common local potential and for producing a potential voltage as a function of the spontaneous potential of the earth formation close to the electrodes. Means are also included in the well tool for converting the potential voltage into successive electrical signals, such as digital signals, which are a function of successive increments of said potential voltage. Means are included in the well tool for transmitting the electrical signals to the earth's surface. Computer means, located at the earth's surface, are provided, including means for establishing and recording a respective measurement value for each respective signal received at the earth's surface with reference to a common reference value and means for averaging and weighing a predetermined number of such respective measurement values sequentially to produce a baseline level shifting window to effectively force the data of interest to follow a predetermined baseline. Means are provided for integrating and recording the integral of each successive level shifted measurement value to produce a curve closely representative of the spontaneous potential at successive depths within the well bore.

Fulfillment of these objects as well as the presence and fulfillment of other objects will be apparent to one skilled in the art upon a careful reading of the complete specification and claims taken in conjunction with the attached drawing.

BRIEF DESCRIPTION OF THE DRAWING

FIG. 1 is a schematic illustration of the well logging apparatus of the instant invention as suspended in a well bore during a well logging operation.

FIGS. 2, 3 and 4 are simplified alternative electrode circuit diagrams illustrating means for the measurement of differential spontaneous potential.

FIG. 8 illustrates an actual spontaneous potential curve.

FIG. 9 is a plot of the continuous derivative curve corresponding to the actual spontaneous potential curve of FIG. 8.

FIG. 10 illustrates a preferred differential spontaneous potential measurement-taking arrangement.

FIG. 11 illustrates a sampled-data "rectangular" differential approximation to the continuous derivative curve by applying the measurement-taking arrangement of FIG. 10 to the actual spontaneous potential curve of FIG. 8.

FIG. 12 illustrates a reconstructed spontaneous potential curve by numerically integrating the "rectangular" differential approximation curve of FIG. 11, wherein the reconstructed curve is abruptly shifted back to a desired base line after each 40 samples processed.

FIG. 13 illustrates a portion of the reconstructed spontaneous potential curve of FIG. 12 adjusted for base line drift by the use of the moving "window" technique of the instant invention.

DESCRIPTION OF THE PREFERRED EMBODIMENT

Figure 5:
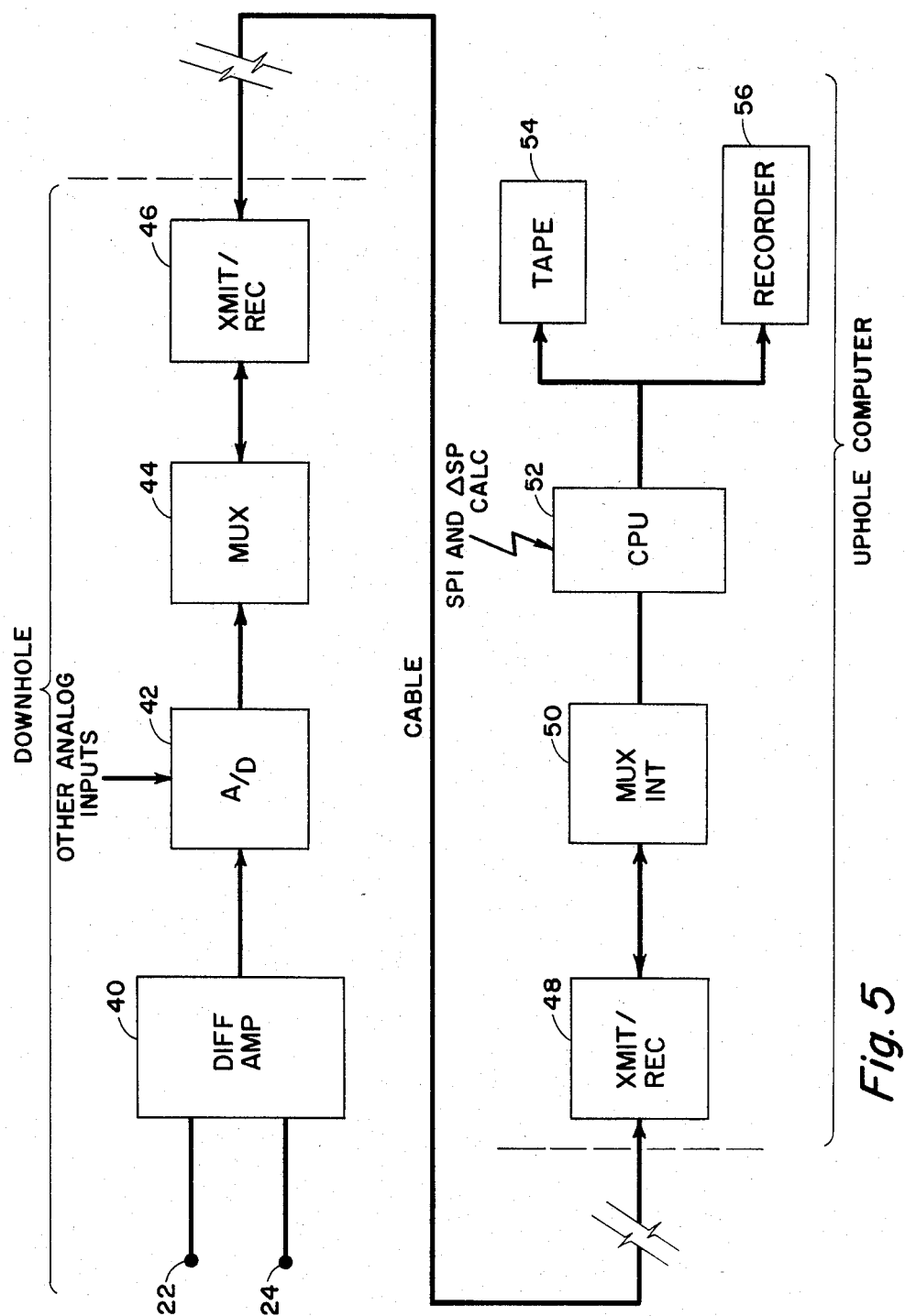
FIG. 5 is a schematic block diagram illustrating how the instant invention is integrated into an overall downhole instrument package and system for making multiple types of measurements.

Referring to FIG. 1, there is shown a well logging tool 10 suspended in a well bore 12 from a logging cable 14. As shown, the logging cable 14 is supported over a sheave 16 and is connected into a receiving system 18 located in a well logging unit (not shown) located at the earth's surface. The output of the receiving system 18 is connected into a conventional well logging recorder 20 as appropriate.

Extending immediately upward from the well tool 10 is an insulated cable electrode or "bridle" assembly 26 as indicated in which are mounted two spaced apart potential electrodes 22 and 24. The electrodes 22 and 24 are electrically connected through the bridle assembly 26 into the tool 10 and into a measurement and signal-producing circuit 28 as shown in dashed lines.

In the broadest sense, the location of electrodes 22 and 24 can be, in principle, the relative positions of any pair of downhole measurement devices suitable for measuring any earth variable wherein signals characteristic of the measured earth variable are monitored. FIGS. 2, 3 and 4 represent alternative simplified fundamental signal-processing circuits 28 wherein voltages $V_1$ and $V_2$, characteristic of the value of the earth variable at positions corresponding to electrodes 22 and 24, are differentially amplified before being transmitted to the earth's surface. FIG. 2 represents a simple signal-processing circuit with input voltages $V_1$ and $V_2$ fed to operational DC amplifier 30 producing a magnified output characteristic of the quantity $V_1-V_2$. Similarly, FIG. 3 shows a differential operational amplifier 32 referenced to a local downhole ground wherein amplifier output $V_1-V_2$ is inductively coupled to the isolation transformer 34 before being transmitted to the surface of the earth (not shown). FIG. 4 involves the DC differential amplifier 36 outputting a signal to an analog-to-digital convertor 38 wherein each input signal is resistively referenced through resistors $R_1$ and $R_2$ to the same downhole ground electrode. For commercial use this would preferably be realized in a fixed sonde.

Figure 6:
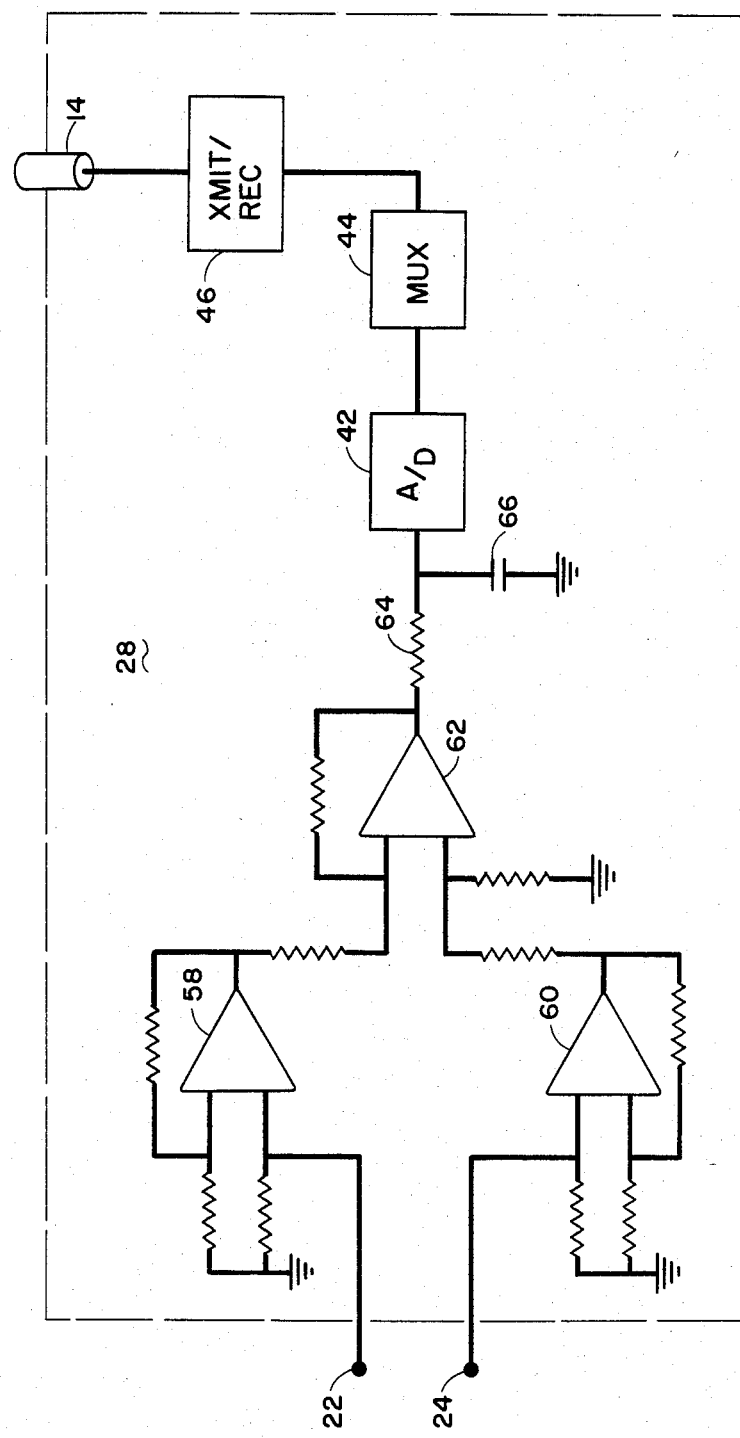
FIG. 6 illustrates the downhole circuit diagram of a preferred embodiment according to the instant invention.

In FIG. 6, the measuring and signal circuit 28 is shown within dashed lines as being connected to electrodes 22 and 24.

Figure 7:
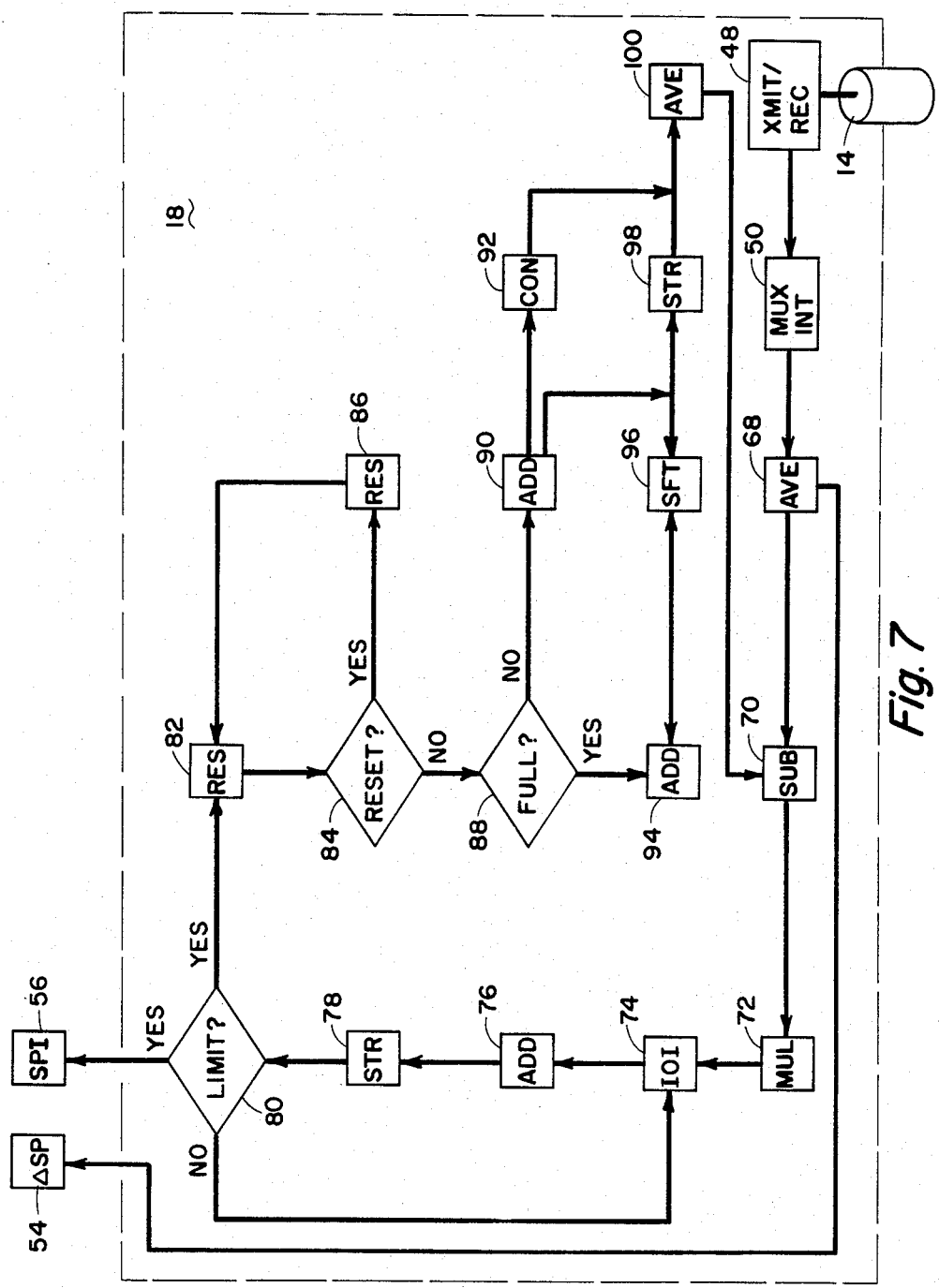
FIG. 7 is a schematic block diagram of a preferred method of processing the differential spontaneous potential measurements.

The circuit 28 is connected into logging tool 10 which in turn is connected via cable 14 into receiving system 18 shown within the dashed lines in FIG. 7.

It is to be understood that logging tool 10 will usually also contain other earth formation measuring apparatus of another kind or kinds (not shown) and that the receiving system 18 will contain additional apparatus (not shown) for receiving and processing additional signals are transmitted through the cable 14 from such other measurement apparatus.

Preferably a single multiplexed data collecting, transmitting, and receiving system is employed. As shown in FIG. 5, the respective voltages of electrodes 22 and 24 are passed to differential amplifier 40 (DIFF. AMP.) before the amplified potential difference signal along with other downhole analog signals are passed through the single analog to digital (A/D) converter circuit 42. The output from the A/D converter circuit 42 is passed to multiplexer (MUX) circuit 44 before entering the transmitter/receiver (XMIT/REC) matching circuit 46. The digital data or signals are then preferably transmitted sequentially through a single logging cable to the second transmitter/receiver (XMIT/REC) matching circuit 48 whereupon the multiplexer interface (MUX INT) circuit 50 directs the desired differential spontaneous potential data and other pertinent data to the computer (CPU) processor 52 for further processing before printing the desired logs on tape recorder devices 54 and 56.

The cable electrode assembly 26 will usually be provided in the form of a neoprene rubber sheath or its equivalent extending upwardly around the logging cable 14 for a distance of about 20 to 30 feet. The electrodes 22 and 24 may be spaced above the tool 10 at a distance, for example, of about 10 feet or more. The electrodes 22 and 24 have been spaced 2 feet apart on a prototype arrangement, but may be spaced closer or further apart as is suitable for the particular situation encountered and results desired.

In prototype tools, the electrodes 22 and 24 have been successfully provided as lead coils and as rusted iron rings. A general requirement for the electrodes 22 and 24 is that they be substantially identical (matched) in surface area and surface conductivity and also that the surface conductivity be consistent when immersed in the well bore fluids or when subjected to corrosion. Suitable materials have been found to be iron, lead, gold, copper, and the like. A preferred material for the electrodes 22 and 24 is a simple, soft iron which appears to give excellent measurement characteristics when rusted with the rust remaining after forming.

The prototype detection and transmission circuit 28 is shown within the dashed lines in FIG. 6. The portion of the circuit 28 necessary for operation of the present invention is all that is shown from the tool 10, it being understood that other measurements as are well known in the art may be taken by the tool 10 and that the circuits for such measurement will also be included in the commercial tool.

As shown in FIG. 6, the SP electrode 22 is connected into a high gain direct-coupled amplifier 58. The SP electrode 24 is similarly connected into a high gain direct coupled amplifier 60.

The amplifiers 58 and 60 may be of generally available commercial design and will not herein be described in detail. The amplifiers 58 and 60 may each produce a voltage gain of about 2 to 10, for example. The amplifiers 58 and 60 respectively detect the voltages at the electrodes 22 and 24 with respect to a local common ground which, as desired, may be at the same potential as the case of the logging tool 10 or the cable 14.

The amplified potential outputs from amplifiers 58 and 60, corresponding to the potentials on the electrodes 22 and 24, are passed into a differential amplifier 62. This difference in potential is an amplification of the "Delta SP" existing between electrodes 22 and 24. The amplifier 62 may also produce a voltage gain of about 2 to 10 as previously described with respect to amplifiers 58 and 60. The amplified Delta SP produced by the amplifier 62 is then passed through a low pass filter circuit, including a resistor 64 and a capacitor 66, which may be provided to pass frequencies under 10 HZ, for example. This low pass filter will help to eliminate extraneous noise above 10 HZ. This amplified Delta SP voltage signal is then passed into an analog/digital (A/D) converter 68 where it is converted to bits of a digital signal which represents the Delta SP existing between the electrodes 22 and 24 at every half foot interval of earth formation traversed by the well bore, for example, as the tool 10 is moved through the well bore.

The output from the A/D circuit 40 is passed into a multiplexer (MUX) circuit 70. Digital signals from other measurement devices within the tool 10 (not shown) may also be fed into the MUX circuit 70. The output of the MUX circuit 70 is passed into a transmitter/receiver matching circuit 72 and thereon passed through the well logging cable 14 to the earth's surface.

In operation, the potential existing between the SP electrode 22 and the local common grounds is amplified by amplifier 58 by a factor of about 2 to 10 and passed into the differential amplifier 62. The potential existing between SP electrode 24 and the local common ground is amplified by the amplifier 60 (also by an identical factor of about 2 to 10) and also passed into the differential amplifier 62. The amplified difference of the potentials between SP electrodes 22 and 24, which is an amplification of the Delta SP occuring in the well bore, is thereon amplified and passed through the low pass filter circuits 64/66 into the A/D converter 68. The digital output of converter 68 is passed through the multiplexer circuit 70 into the transmitter 72 and through the cable 14 to the earth's surface.

The equations for the computation of the new integrated spontaneous potential (SPI) according to the instant invention when successive measurements of the differential spontaneous potential ($\Delta$SP) are repeatedly made at a fixed spacing ($\Delta l$) between measurements in the well bore can be developed as follows:

$$SP_{(l)} = \int \left(\frac{dSP}{dl}\right)_{(l)} dl \simeq \sum_i \Delta SP_i \cdot \Delta l_i \quad (1-2)$$

In general, the spontaneous potential, $SP_{(l)}$ is a function of the depth or position in the well bore, $l$, and is equal to the integral of the derivative of the spontaneous potential, $dSP/dl$, times $dl$. This integral can be approximated by the summation of the products of the delta or change in the spontaneous potential during interval $i$, $\Delta SP_i$, times the length or distance of the interval $i$, $\Delta l_i$.

In computing the integrated spontaneous potential, SPI, of the instant invention, the distance between measurements is maintained at a constant and fixed length and a moving window of length equal to x times this fixed distance is established. The initial values of the differential spontaneous potential, $\Delta SP_0$, and the integrated spontaneous potential, $SPI_0$, are set equal to zero. Successive values of integrated spontaneous potentials, $SPI_i$'s are numerically calculated from corresponding measured $\Delta SP$'s by one of the following two equations depending on whether or not enough data points have been measured to establish the full length traveling window.

for $l \leq X$ \hfill (3)

$$SPI_i = \left\{ \frac{\Delta SP_i + \Delta SP_{i-1}}{2} - \frac{\sum_{j=1}^{j=i-1} \Delta SP_j}{i} \right\} \cdot \Delta l + \sum_{n=1}^{n=i-1} SPI_n$$

for $i > X$ \hfill (4)

-continued $$SPI_i = \left\{ \frac{\Delta SP_i + \Delta SP_{i-1}}{2} - \frac{\sum_{j=i-x-1}^{j=i-1} \Delta SP_j}{X} \right\} \cdot$$

$$\Delta l + \sum_{n=1}^{n=i-1} SPI_n$$

where: $i$ is an integer corresponding to the number of incremental steps of $\Delta l$ in length away from the origin; $X$ is the length of the window expressed as an integer corresponding to the number of units of length $\Delta l$ present; $SPI_i$ is the differential spontaneous potential of the $i^{th}$ interval; and $\Delta SP_i$ is the differential spontaneous potential of the $i^{th}$ interval from the origin and corresponds to voltage difference, $V_1-V_2$, measured across the closely spaced electrodes when centered about the $i^{th}$ depth in the well bore.

In FIG. 7, the receiving system 18 is shown to include a transmitter/receiver matching circuit 48 and a multiplexer (MUX) circuit 50. The remaining elements shown schematically in receiver 18 comprise a functional flow diagram of the computer implemented algorithim included as part of the receiver system 18 wherein each block of the diagram represents a function element of the computer used to perform the computations corresponding to the above equations as hereinafter described. Each block will be referred to as a section, station, or stage.

The receiver circuit 48 is adapted to receive the Delta SP digital signal through logging cable 14 and to transmit such signal to the multiplexer circuit 50. The MUX circuit 48 discriminates the Delta SP signal from the other signals as are received up cable 14 from the measuring and signal circuit 28.

The Delta SP signal is then passed into the computer portion of the receiver 18 and first to an AVERAGE section 68 where most recently received Delta SP, $\Delta SP_i$, is added to the last received delta SP, $\Delta SP_{i-1}$, and the total is divided by 2. The Delta SP as averaged, $$\frac{\Delta SP_i - \Delta SP_{i-1}}{2},$$

in section 68 is passed to Delta SP indicator 54 and also to SUBTRACT stage 70.

In the SUBTRACT stage 70, the averaged Delta SP transferred from AVERAGE stage 68 has subtracted therefrom the running average total Delta SP, $$\sum_{j=0}^{j=i-1} \Delta SP_j,$$

from an AVERAGE TOTAL stage 100 as hereinafter described.

The value computed at SUBTRACT stage 70 is multiplied by the distance, $\Delta l$, between data samples at MULTIPLICATION STAGE 72 and thereon has added thereto an OPERATOR INPUT OFFSET at stage 74 as determined by subsequent LIMIT TEST station 80.

The adjusted SP, $$\left\{ \frac{\Delta SP_i - \Delta SP_{i-1}}{2} - \frac{\sum_{j}^{i} \Delta SP_j}{i} \right\} \cdot \Delta 1,$$

from section 74 and the previous integral SP from STORE stage 78 are loaded to ADD INTEGRAL SECTION 76 where a current integral SP is computed equal to their sum. This current SP is saved at STORE stage 78 and becomes the previous integral SP for the next iteration.

At LIMIT TEST station 80, the integral SP from stage 78 is interrogated to see if its value is within set limits and, if YES, is passed to an integrated SP display indicator 56 and the current Delta SP is passed to RESET stage 82 to RESET the Delta SP as necessary. If the value is not within the set limits the computation is looped back through OPERATOR INPUT OFFSET at stage 74 to reestablish a value within the limits.

The Delta SP from stage 80 is also tested at RESET TEST station 84 to determine if the averaging table, the moving window, needs to be reset. If necessary, the reset table is reset at RESET station 86 and then looped back to RESET STAGE 82.

At the averaging table FULL TEST section 88, the Delta SP is tested for the averaging table being full. If it is not, the current Delta SP is added to the previous Delta SP sum at ADD stage 90 and both are loaded to current SP STORE stage 98 as the next member of the Delta SP table and as the current Delta SP sum, respectively. The event then passes through INCREMENTAL COUNTER 92 and on to AVERAGE stage 100 where the incremental number and the table entries are used to calculate the average Delta SP value, $$\frac{\sum_{j}^{i} \Delta SP_j}{i}.$$

If the test stage 88 indicates that the table is full, the current Delta SP is added at ADD stage 94 to the total of the Delta SP in the table less the value of the earliest Delta SP establishing a current Delta SP sum. From stage 94 the averaging table is shifted at shift stage 96 so that the earliest entry is removed and there is room at the other end for a new current Delta SP. Thus the current SP is saved at STORE station 98 at the end of the table. From stage 84 the statement is averaged at AVERAGE stage 100 using the increment number of table entries from stage 90 and the resulting average Delta SP is subtracted from the next successive Delta SP at AVERAGE stage 70 as previously described.

Figure 14:
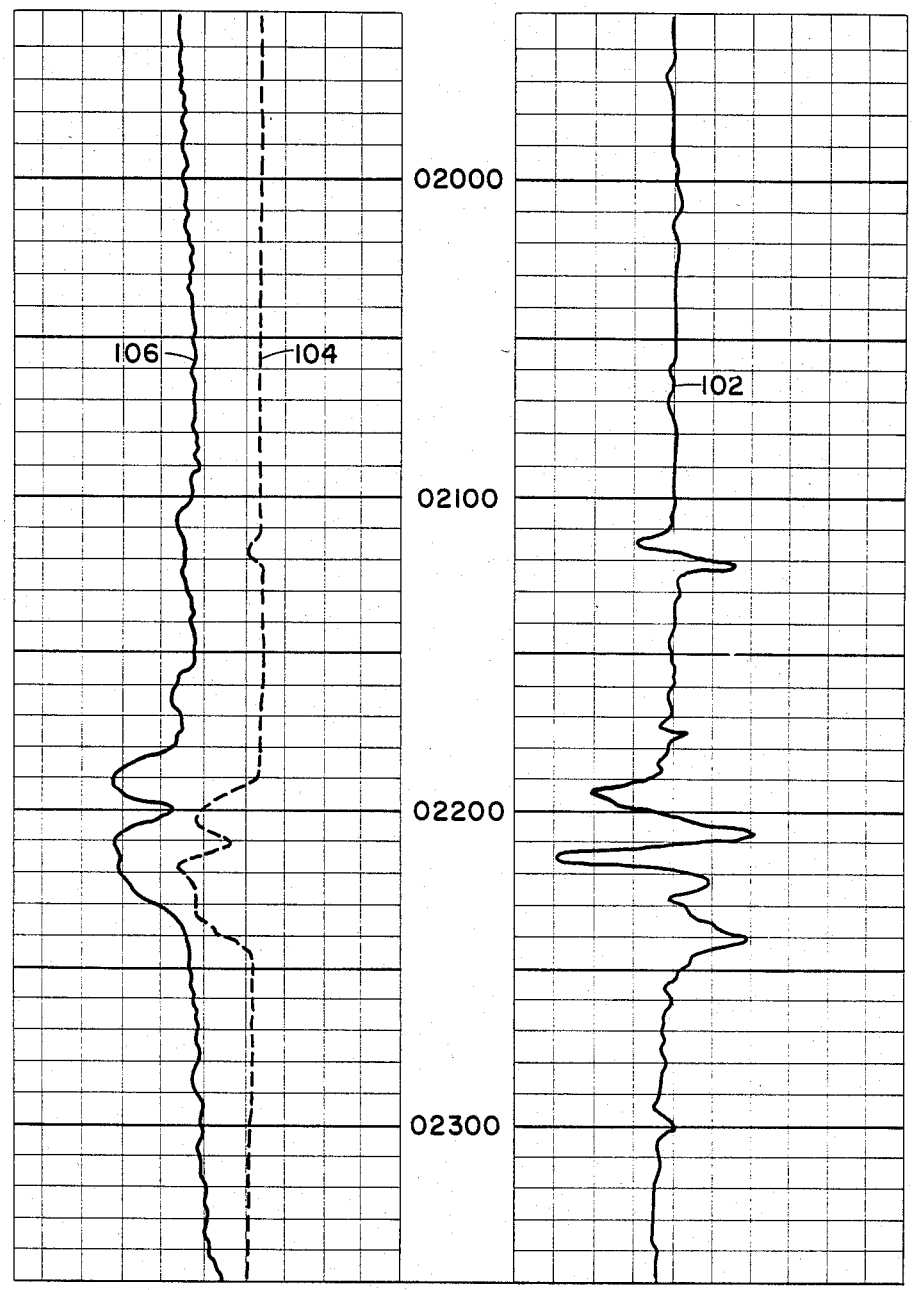
FIG. 14 illustrates a section of a differential spontaneous potential well log and its corresponding integrated spontaneous potential produced in accordance with the technique of the instant invention, as well as a conventional prior art spontaneous potential curve which has been logged through the same section of earth formation.

The values of the Delta SP and integrated SP found at the indicator 54 and 56 are the same values as recorded at recorder 20 and shown in FIG. 14 as curve 102 and 104, respectively.

To further illustrate the computational methods associated with the instant invention, FIG. 8 presents an actual spontaneous potential curve as measured over a 30 foot section of a well bore. FIG. 9 represents the continuous derivative curve of the same spontaneous potential curve over the same section. The vertical axis of each figure is expressed in millivolts while the horizontal axis, corresponding to the depth or position in the well, is expressed in terms of an index i starting at $i = -1$ (as will be appreciated upon further explanation), wherein each increment along the horizontal axis represents a 6 inch displacement in the well bore. In order to simulate the numerical Delta SP data characteristic of the instant invention, the values of the voltages of FIG. 8 at each index were used according to a measuring scheme illustrated in FIG. 10 (i.e., pairs of voltages spanning five index members) to derive differential voltages between the respective indices. As illustrated in FIG. 10, the measuring scheme corresponds to two electrodes, 22 and 24, spaced 2 feet apart (five index numbers) starting with the pair $i = -1$ and $i = 3$. The respective voltages at these two positions were used to compute a differential voltage, $\Delta V_i = V_3 - V_{-1}$, which was then assigned to the index of the midpoint ($\Delta V_1$) between the positions of the electrodes. This accounts for the initial index of $i = -1$. As the electrodes progress away from the origin in steps of 6 inches (one index number) a series of $\Delta V_i$'s are produced simulating the numerical $\Delta$SP data. The TABLE presents the actual numerical values associated with FIG. 8 as a function of index i.

The $\Delta V_i$ column of the TABLE is plotted in FIG. 11 as a staircase numerical representation of the Delta SP curve. A smooth continuous line is drawn to approximate the continuous derivative curve. By comparing the curve of FIG. 11 to that of FIG. 9 it is readily apparent that the general overall nature of the true continuous derivative curve is preserved but resolution of closely spaced events is somewhat lost; e.g., relative maximum at $i = 5$ is not observed. This loss of resolution is predominately, in this case, felt to be a function of the choice of spacing between the electrodes. The 2 foot spacing used in this example is considered to be a preferred upper limit unless it is known that the earth substrata being measured does not involve closely spaced beds. Although measuring at closely spaced intervals (e.g., every 6 inches in this case) will compensate to a certain degree any loss of resolution, it is apparent that some loss of detail in the differential curve will be inherent. It is further believed that about a 1 foot spacing between electrodes is a preferred lower limit based on decreased magnitude of the voltage difference, while 18 inches is currently considered an excellent compromise. However, it should be readily appreciated that spacings outside the preferred range are operative.

In order to simulate the integrated SP curve and the so-called compensated or adjusted integrated SP curve (SPI), the TABLE further presents the product of the $\Delta V_i$'s . $\Delta l$ (space between measurement; 6 inches) and the accumulated product, $$\sum_{n}$$

$(\Delta V n) \cdot (\Delta l)$, at each respective index. In order to illustrate the problems associated with base line drift, the cumulative column was arbitrarily adjusted back to 0 at index point $i = 43$. FIG. 12 illustrates the smoothed curve produced by plotting the numerical cumulative data and drawing a continuous line through the data points. When compared to the original SP curve of FIG. 8 a remarkable resemblence is clear even with the knowledge of loss of resolution in the derivative curve. The disontinuity at $i = 43$ is clearly portrayed and is indicative of an abrupt shift used to compensate for base line drift.

FIG. 13 illustrates a compensated or adjusted integrated SP curve after sufficient data points to establish a traveling or moving window have been collected. In this case a window of only 10 feet in length (approximately twenty index numbers) was employed to establish a numerical ΔSP average, $$\frac{1}{20} \sum_{m=i-1}^{m=i-20} \Delta V_n,$$

which in turn was multiplied by Δl and subtracted from the cumulative SP, $$\sum_{n=0}^{n=i} \Delta V_n \cdot \Delta l,$$

as presented numerically in the TABLE.

Certain features should be readily apparent from this computation. First the compensated or adjusted SPI curve still resembles the true SP curve of FIG. 8, even though a very short window, 10 feet in this case, was employed (in principle as the window length approaches the measurement interval the curve is forced to 0). And second, the numerical approximation to mathematical integration in the instant invention can employ various techniques including the very simplest approximations under the least favorable circumstances (large electrode spacing, short window length) and still produce useful logs. Consequently it is to be understood that more sophisticated mathematical quadrature formulas and techniques are to be considered equivalent to the exemplified methods.

TABLE

| i | $SP_i$ | $\Delta V_i$ | $\Delta V_i$ | $\Delta V_i \cdot \Delta l$ | $\sum_{n=0}^{n=i} \Delta V_n \cdot \Delta l$ | $\frac{1}{20} \sum_{n=i-1}^{n=i-20} \Delta V_n \cdot \Delta l$ | $\sum_{n=0}^{n=i} \Delta V_n \cdot \Delta l - \frac{1}{20} \sum_{n=i-1}^{n=i-20} \Delta V_n \cdot \Delta l$ |
|---|---|---|---|---|---|---|---|
| −1 | 2.0 | | | | | | |
| 0 | 1.83 | | | | | | |
| 1 | 2.0 | 1.25 | 0.625 | 0.625 | | | |
| 2 | 3.0 | 1.0 | 0.5 | 1.125 | | | |
| 3 | 3.25 | 0 | 0 | 1.125 | | | |
| 4 | 2.83 | −1.25 | −0.625 | 0.5 | | | |
| 5 | 2.0 | −1.5 | −0.75 | −0.25 | | | |
| 6 | 1.75 | −0.6 | −0.3 | −0.55 | | | |
| 7 | 1.75 | 1.0 | 0.5 | −0.05 | | | |
| 8 | 2.23 | 3.3 | 1.65 | 1.60 | | | |
| 9 | 3.0 | 2.75 | 1.375 | 2.975 | | | |
| 10 | 5.05 | 0.5 | 0.25 | 3.00 | | | |
| 11 | 4.5 | −0.3 | −0.15 | 2.85 | | | |
| 12 | 2.73 | −2.0 | −1.0 | 1.85 | | | |
| 13 | 2.7 | −1.0 | −0.5 | 1.35 | | | |
| 14 | 3.05 | 0.6 | 0.3 | 1.65 | | | |
| 15 | 3.5 | 1.0 | 0.5 | 2.15 | | | |
| 16 | 3.33 | 1.0 | 0.5 | 2.65 | | | |
| 17 | 3.7 | 0.2 | 0.1 | 2.75 | | | |
| 18 | 4.05 | 0.2 | 0.1 | 2.85 | | | |
| 19 | 3.7 | 0.3 | 0.15 | 3.00 | | | |
| 20 | 3.53 | 0.35 | 0.175 | 3.175 | | | |
| 21 | 4.0 | 1.3 | 0.65 | 3.825 | | | 3.66625 |
| 22 | 4.4 | 2.3 | 1.15 | 4.975 | | | 4.815 |
| 23 | 5.0 | 2.0 | 1.0 | 5.975 | | | 5.7825 |
| 24 | 5.83 | 0.6 | 0.3 | 6.275 | | | 6.0325 |
| 25 | 6.0 | −0.75 | −0.375 | 5.9 | | | 5.61125 |
| 26 | 5.0 | −1.75 | −0.875 | 5.025 | | | 4.7175 |
| 27 | 4.25 | −1.75 | −0.875 | 4.15 | | | 3.87125 |
| 28 | 4.08 | 0 | 0 | 4.15 | | | 3.94 |
| 29 | 4.25 | 1.3 | 0.65 | 4.8 | | | 4.68 |
| 30 | 5.0 | 2.1 | 1.05 | 5.85 | | | 5.78 |
| 31 | 5.55 | 1.25 | 0.625 | 6.475 | | | 6.3325 |
| 32 | 6.18 | −0.1 | −0.05 | 6.425 | | | 6.24375 |
| 33 | 5.5 | −1.75 | −0.875 | 5.55 | | | 5.32125 |
| 34 | 4.9 | −3.0 | −1.5 | 4.05 | | | 3.84 |
| 35 | 3.8 | −2.9 | −1.45 | 2.6 | | | 2.48 |
| 36 | 3.18 | −2.3 | −1.15 | 1.45 | | | 1.4275 |
| 37 | 2.6 | −1.25 | −0.625 | 0.825 | | | .885 |
| 38 | 2.6 | 0 | 0 | 0.825 | | | .92126 |
| 39 | 2.55 | 1.2 | 0.6 | 1.425 | | | 1.52625 |
| 40 | 3.18 | 1.6 | 0.8 | 2.225 | | | 2.30375 |
| 41 | 3.8 | 1.5 | 0.75 | 0.75 | | | 3.0225 |
| 42 | 1.1 | 0.55 | 1.3 | 3.5675 | | | |
| 43 | 4.05 | 0.6 | 0.3 | 1.6 | | | 3.8975 |
| 44 | 4.28 | 0.3 | 0.15 | 1.75 | | | 4.0825 |
| 45 | 4.4 | 0.1 | 0.05 | 1.8 | | | 4.14 |
| 46 | 4.5 | 0.1 | 0.05 | 1.85 | | | 4.16875 |
| 47 | 4.15 | 0.6 | 0.3 | 2.15 | | | 4.4225 |
| 48 | 4.38 | 0.8 | 0.4 | 2.55 | | | 4.76375 |
| 49 | 5.0 | 0.9 | 0.45 | 3.0 | | | 5.19375 |
| 50 | 5.3 | −0.1 | −0.05 | 2.95 | | | 5.15375 |
| 51 | 5.05 | −1.7 | −0.85 | 2.1 | | | 4.35875 |
| 52 | 4.28 | −3.0 | −1.5 | 0.6 | | | 2.9325 |
| 53 | 3.3 | −3.3 | −1.65 | −1.05 | | | 1.355 |
| 54 | 2.3 | −2.0 | −1.0 | −2.05 | | | .28875 |
| 55 | 1.75 | −0.75 | 0.375 | −2.425 | | | −.21125 |
| 56 | 2.28 | 0.1 | 0.05 | −2.375 | | | −.2525 |
| 57 | 2.55 | 0.1 | 0.05 | −2.325 | | | −.2575 |
| 58 | 2.4 | | | | | | |
| 59 | 1.85 | | | | | | |

In operation, the tool 10 is usually lowered to below the deepest well formation to be measured, then brought up through the well bore 12 at a constant and designated speed. As the tool 10 is brought up through the well bore, the spontaneous potentials respectively appearing at electrodes 22 and 24 are detected and amplified by amplifiers 58 and 60. Thus the outputs of the amplifiers 58 and 60, are the amplified spontaneous potentials appearing at electrodes 22 and 24 with reference to a local common ground potential as previously described. These respective outputs from the amplifiers 58 and 60 will pass into a differential amplifier 62 where the difference in the potential between the outputs of amplifiers 58 and 60 is additionally amplified as the spontaneous potential between the electrodes 22 and 24. This amplified potential difference is then passed through the low pass filter circuit 64/66.

The output of the filter circuit, which is the output of the amplifier 62, smoothed to a signal of less than 10 HZ is passed into an A/D converter 42. In A/D converter 42, the analog signal from the amplifier 62 is converted into an appropriate digital signal and passed into MUX circuit 44.

At the appropriate times, in accordance with the repetition rate of MUX circuit 44, and in connection with such other digital signals as may be generated within the tool 10, the digital signal representative of ΔSP from A/D converter 42 is passed through MUX circuit 44, the transmitter 46, and through the logging cable 14.

In constructing a prototype apparatus for use in testing the instant invention, a preferred system involved 24 inch spacing of a pair of matched lead electrode rings mounted in a neoprene sheath which when operated made measurements in the well bore every 6 inches. The downhole instrumentation was essentially as presented in FIGS. 1 and 6 with the initial DC amplification involving a gain of 2 followed by a differential amplification with an additional gain of 5. The downhole analog-to-digital conversion was made by use of a high-temperature version of a MN 5700 made by Micro Networks, which was coupled to an in-house designed multiplexer. The system was powered by approximately a 120 volt DC source at the cable head. For impedance matching and to ensure the desired signal would be supplied at the upper end of the cable, the downhole digital data went through a final gain or boost to approximately 10 volts (peak to peak) before transmission to the surface. The digital data involved 16 bit words with serial address and command with a typical 16 bit breakdown of; 5 bits telling which tool, 3 or 4 bits which command, and 8 or 4 bits for channel selection. The data stream employed a Manchester Protocol Encoder with parallel data output. A Raytheon 500 computer, as furnished by the Raytheon Company, was used for data processing.

In FIG. 14 there is shown a section of a well log for a well depth of somewhat under 2,000 feet to somewhat over 2,300 feet. At the right of the log is shown a curve 102 of successive Delta SP signals representing the successive Delta SP measurements taken upward through the well bore according to the instant invention. In the center of the log are shown a section of numbers indicating well depths of 2,000, 2,100, 2,200, and 2,300 feet with individual graduations between the numbers being representative of 10 feet of earth formation and well depth. At the left of the numbers, is another curve 104 which is a recording of the integrated SP computed simultaneously with the Delta SP curve 102. The integrated SP curve 104 is displayed as a dashed line. The integrated curve 104 is directly comparable with the conventional SP curve as derived and recorded by the prior art. The curve 106 shows such a comparative prior art SP curve made from a conventional SP measurement in the same section of the well bore. It is to be noted that similar excursions of the curves 104 and 106 are vertically displaced about 10 feet due to different electrode positions with respect to depth.

It is also to be noted that the conventional SP curve 106 shows a drift to the left from bottom to top of FIG. 14. Such drift is ordinary with the conventional SP and is usually removed manually.

As can be seen when comparing the Delta SP curve 102 with integrated SP curve 104, there is far more definition and detail in the SP curve 102 than in the integrated SP curve. Furthermore, the curve 102 reflects accurate measurement of the Delta SP. Consequently, the curve 104, which is a mathematical summation of curve 102, is considered to be a more accurate SP measurement than the curve 106.

The integrated SP as derived by this invention is considered to be at least as accurate, and likely more accurate, than any comparative SP available. The greater definition, accuracy, and detail available to the well log analyst in the Delta SP curve 102 and in the integrated SP curve 104 give additional value to the apparatus and method of the present invention over the prior art. Also, and of significant importance, the integrated SP of the present invention is derived and recorded over a single conductor cable without the need of a surface ground electrode.

Figure 15:
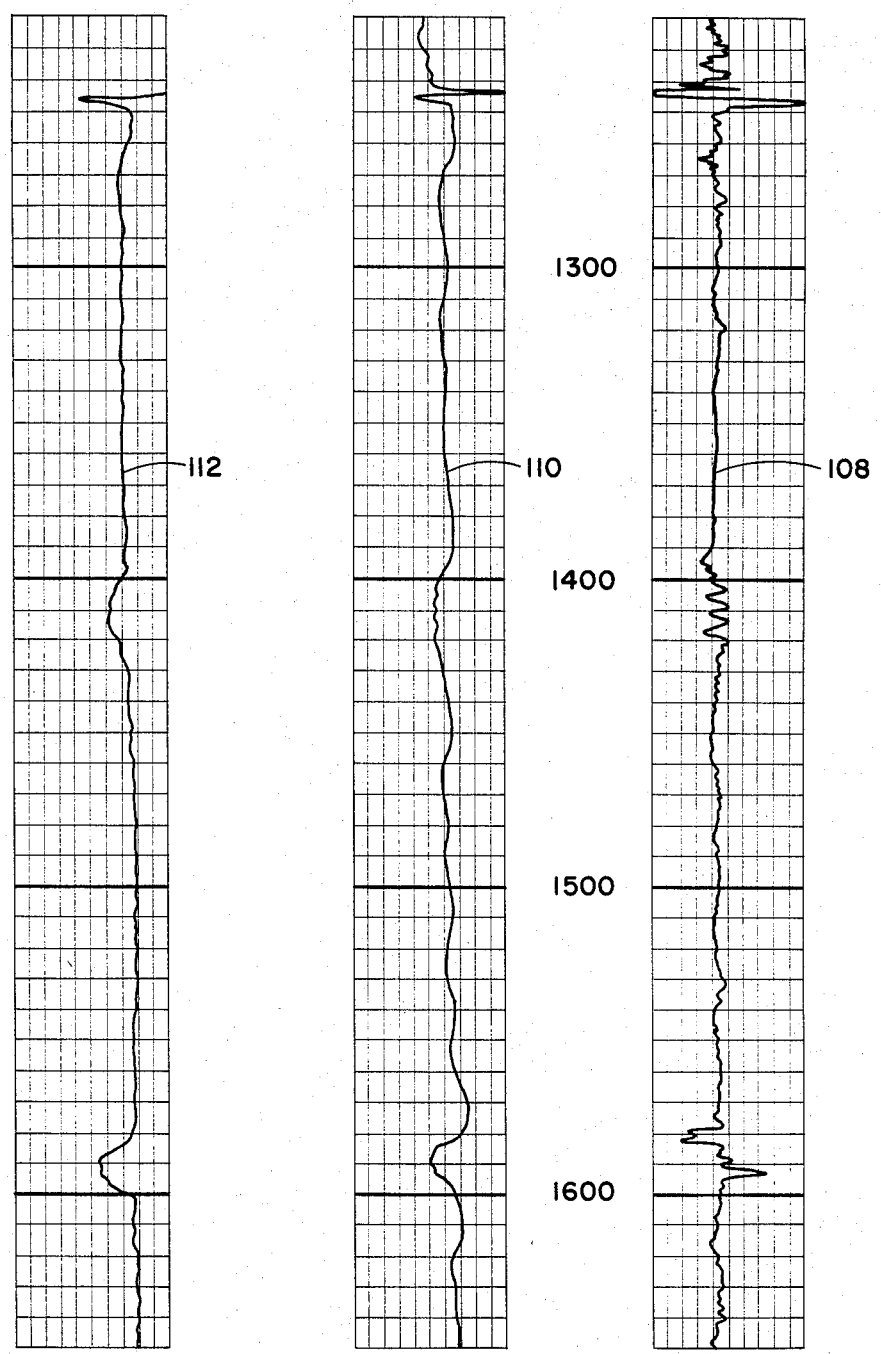
FIG. 15 illustrates the differential and integrated SP logs and a conventional SP curve measured for another larger section of a test well similar to FIG. 14.
Figure 15:
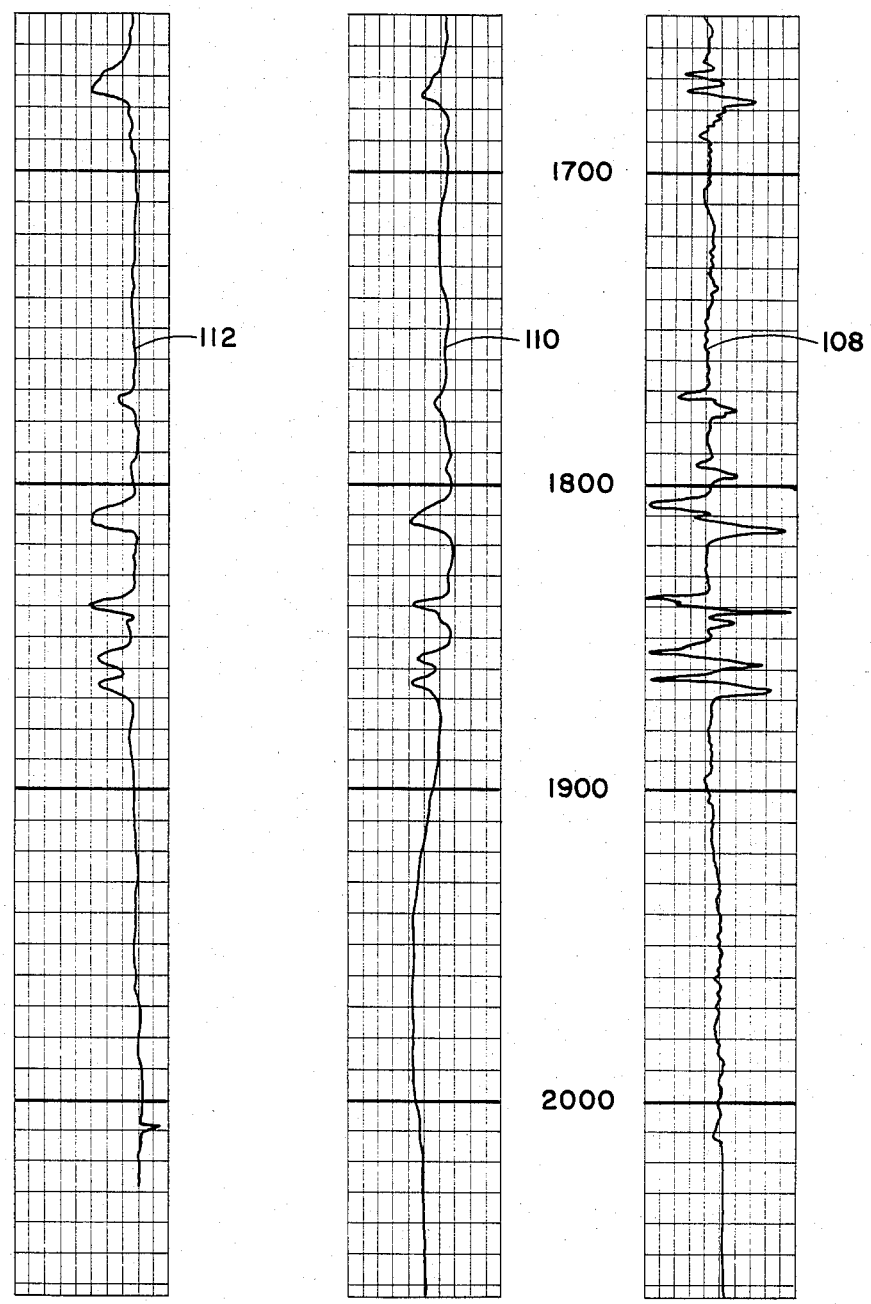

As a further illustration of the present invention, FIG. 15 presents the conventional SP curve 112, the integrated SP curve 110, and the Delta SP curve 108 of a section of well between the depths of about 1,300 feet to approximately 2,000 feet. The Delta SP curve was measured by a prototype apparatus as previously described using a computational window 10 feet in length with data points being taken every half foot. Again, curves 108 and 110 compare favorably with the conventional SP curve 112. Both exhibit excellent resolution and freedom from base line drift while the combination of the Delta SP and SP curves clearly discriminate different types of events appearing on the SP curve which cannot be observed by looking at the conventional SP log by itself. Furthermore, the integrated SP curve of the present invention does not appear to suffer from the accumulation of numerical error as predicted in the prior art.

Having thus described the preferred embodiments, it should be apparent that the basic invention can be employed with other various embodiments including the measurement of downhole variables other than the spontaneous potential without departing from the intended breadth and scope of the attached claims. In other words, the invention is viewed as being generic to essentially any downhole differential logging procedure such as induction, resistivity, gravity logs and the like. In addition to the previously mentioned variety of numerical integration techniques for creating the SP curve from the Delta SP curve, the establishing of the window can be performed by any of the known methods for accounting for base line drift including having the window precede or follow the measurements or both. The use of dedicated computer memory in the latter two cases is particularly appropriate and should be considered desirable in addition to the described preferred embodiments. Likewise various numerical or electrical biasing of the curves can be advantageously employed according to the specific needs and can be particularly useful during the first few data points before an accurate base line value or window is established. It should further be appreciated that the method and technique for making the measurements can be by any method known in the well logging art and the transmission of data to the earth's surface can involve means and methods other than electrical transmission such as acoustic transmission and the like. Therefore, it is to be understood that the invention is not limited to the embodiments set forth herein for purposes of exemplification, but is to be limited only by the scope of the attached claims, including a full range of equivalents to which each element thereof is entitled.

We claim:
1. A method of logging an earth formation comprising the steps of:
(a) measuring the difference of an earth variable between two closely spaced positions within a well bore;
(b) establishing a window of such measurements adjacent to the position of the measurement of step (a);
(c) establishing the average value of said measurements within said window;
(d) subtracting a weighted portion of said average value within said window from said measurement of step (a); and
(e) repeating steps (a) through (b) at successive depths within said well bore, thereby producing a differential well log.

2. A method of logging according to claim 1 further comprising the step of integrating said differential well log.

3. A method according to claim 1 or 2 wherein said earth variable is the differential spontaneous potential and said measurement of step (a) involves determining the electrical potential between two closely spaced electrodes.

4. A method according to claim 3 wherein the potentials of said closely spaced electrodes are each measured with respect to a third downhole reference electrode.

5. A method according to claim 3 wherein said measured differential spontaneous potentials are amplified and digitized downhole before being transmitted to the earth's surface.

6. A method according to claim 4 wherein said closely spaced electrodes are spaced from about 1' to 2' apart, said third downhole reference electrode is remote from said closely spaced electrodes by a distance of at least about 6', said window is in the range from about 10' to 50' long and said repeated measurements at said successive depths occur at least about every 2'.

7. A method according to claim 4 wherein said closely spaced electrodes are about 18" apart, said third downhole ground electrode is remote from said closely spaced electrodes by a distance of at least 8', said window is about 20' long and said repeated measurements at said successive depths occur at about every 6".

8. An apparatus for logging an earth formation comprising:
(a) a means for measuring the difference of an earth variable between two closely spaced positions within a well bore;
(b) a means for establishing a window of such measurements adjacent to the position of the measurement of subparagraph (a);
(c) a means for establishing the average value of said measurements within said window;
(d) a means for subtracting said average value within said window from said measurement of subparagraph (a); and
(e) a means for repeating the functions of subparagraphs (a) through (d) at successive depths within the said well bore thereby producing a differential well log.

9. An apparatus of claim 8 further comprising a means for integrating said differential well log producing an integral well log.

10. An apparatus of claim 8 or 9 wherein said variable is the spontaneous potential and said measurement involves determining the electrical potential between two closely spaced electrodes.

11. An apparatus of claim 10 wherein said closely spaced electrodes are each referenced to a third downhole ground electrode.

12. An apparatus of claim 10 further comprising a means for amplifying and digitizing said measured spontaneous potential differences downhole before being transmitted to the earth's surface.

13. An apparatus of claim 11 wherein said closely spaced electrodes are from about 1' to 2' apart, said third downhole ground electrode is remote from said closely spaced electrodes by a distance of at least about 6', said window is from about 10' to 50' long and said repeated measurements at said successive depths occur at least about every 2'.

14. An apparatus of claim 11 wherein said closely spaced electrodes are about 18" apart, said third downhole ground electrode is remote from said closely spaced electrodes by a distance of at least about 8', said window is about 20' long and said repeated measurements at said successive depths occur at about every 6".

* * * * *